May 10, 1966   R. W. SCREVEN   3,250,021
EDUCATIONAL DEVICE

Filed May 2, 1962   2 Sheets-Sheet 1

INVENTOR.
RUTH W. SCREVEN
BY
ANDRUS & STARKE
ATTORNEYS.

May 10, 1966  R. W. SCREVEN  3,250,021
EDUCATIONAL DEVICE
Filed May 2, 1962  2 Sheets-Sheet 2
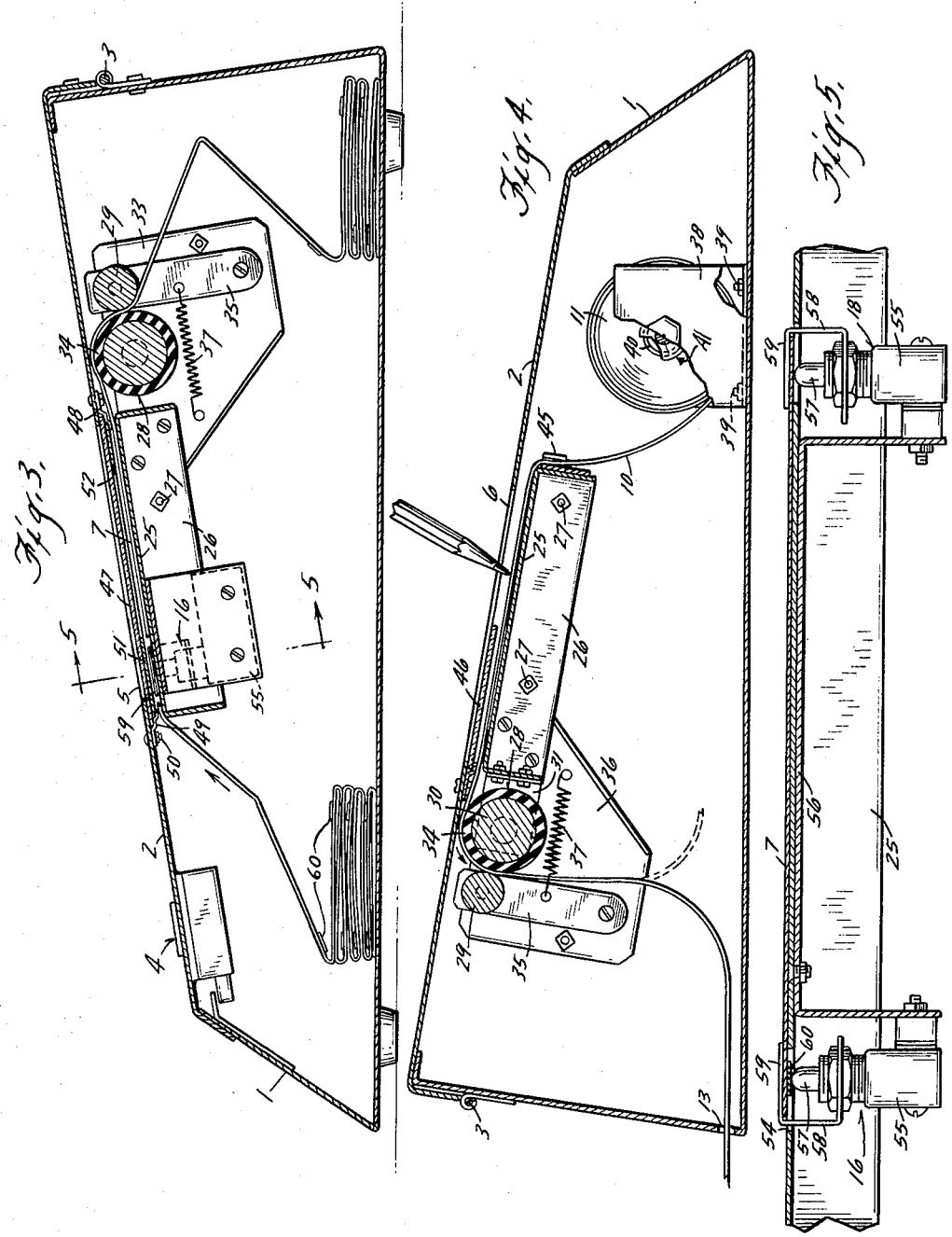
INVENTOR.
RUTH W. SCREVEN
BY
ANDRUS & STARKE
ATTORNEYS.

3,250,021
EDUCATIONAL DEVICE

Ruth W. Screven, Whitefish Bay, Wis., assignor to Modern Teaching Associates, Inc., a corporation of Wisconsin
Filed May 2, 1962, Ser. No. 191,847
9 Claims. (Cl. 35—9)

This invention relates to an educational device and particularly to a device for sequentially presenting a program of a series of separate stimuli such as questions and responses such as answers with means provided for recording a response which is subsequently checked against the correct answer.

Recent developments have been rapidly made in the field of educational devices as teaching aids to be employed in schools, in industrial and commercal plant training and the like as well as self-educational aids to be employed in the home. One type of apparatus provides means for sequentially presenting questions and answers of a selected teaching program. Generally, such machines have been manually actuated with mechanical mechanism coupling a movable input member to a carrier means for the questions and answers. Electrically controlled systems have been proposed but are relatively expensive and complicated.

The present invention is particularly directed to a durable and relatively inexpensive and electrically operated teaching machine or educational device.

In accordance with the present invention, a housing or other support is provided having a cover behind which stimulus information and response information carrying means are provided to sequentially present the stimulus and response information within a viewing opening or the like. Means are provided to allow the student, in one manner of another, to insert the response which he considers to be proper.

A drive means is coupled to the program carrier as well as the response receiving means if separately provided to establish a timed movement therebetween. The drive means is conjointly controlled by an input means under the selected operation of the student and the movement of the program carrier. The system is set up to sequentially expose stimulus information and then a proper response. When the stimulus information appears, the student inserts a selected response and then actuates the drive to expose the correct response.

Simultaneously, with the movement of the correct response into viewing position, the inserted response is placed under a protective transparent cover or the like where it is visible but inaccessible. Consequently, the student can continuously check the correctness of his response but cannot readily change his response once it has been placed in the machine. In this manner, the student is presented with stimulus information requiring a response, which he provides and then immediately checks against the most correct response.

In accordance with another aspect of this invention, a skip control is provided for automatically driving the program carrier to skip one or more stimuli and associated responses. If the student is progressing rapidly, the educational process can in this manner be increased by presenting more difficult questions. The present invention may also include means for commenting and/or explaining the correct answer.

The present invention is readily operated and may be employed by young children in the early period of their education, either in a school or at home.

The drawings furnished herewith illustrate the best mode presently contemplated for carrying out the invention.

In the drawings:

FIG. 3 is a vertical section taken on line 3—3 of FIG. 1;

FIG. 4 is a similar vertical section taken on line 4—4 of FIG. 1;

FIG. 5 is an enlarged sectional view taken on line 5—5 of FIG. 3; and

Figure 1:
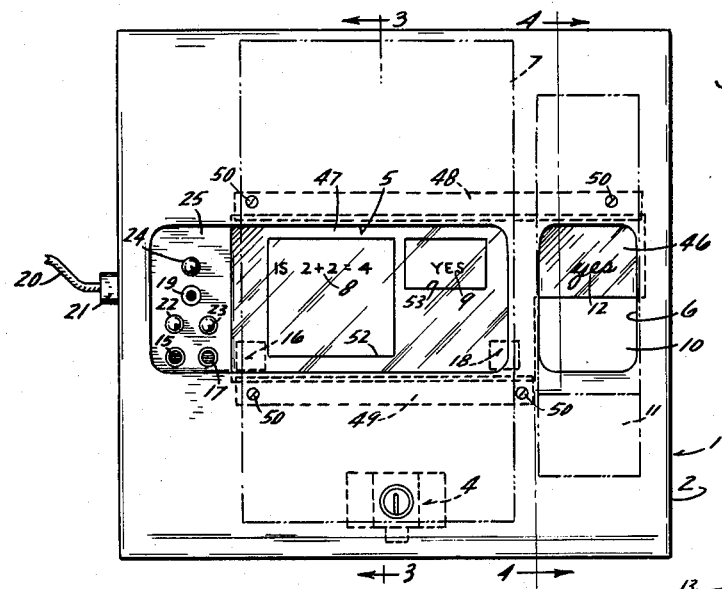
FIG. 1 is a top elevational view of the educational device constructed in accordance with the present invention.

Referring to the drawings and particularly to FIGS. 1 and 3, the illustrated teaching machine or educational device includes a box-like housing 1 having a top cover 2 secured to the back wall thereof by a piano hinge 3. A key-lock 4 is provided in the front portion of cover 2 and housing 1 for restricting opening of the cover 2 to selected personnel. Housing 1 is of a size which can be conveniently carried for transporting of the device. The top cover 2 includes a program presentation window or opening 5 and a write-in window or opening 6 arranged in laterally spaced side-by-side relation generally centrally of the front and back edges of the cover 2. A question and answer program tape 7 of paper or the like is folded within the front portion of the box-like housing 1, as shown in FIG. 3, and carries a series of alternate questions 8, as the stimuli or stimulating information, and correct answers 9, as the proper response, longitudinally spaced along the tape. The program tape 7 is progressively moved beneath the opening 5 to sequentially present the questions 8 and answers 9 to the student. An answer receiving tape 10 of paper or the like is carried by a supply reel or roll 11 which is rotatably mounted within the front portion of the box-like housing 1 to one side of the folded portion of the tape 7. The tape 10 is passed to the back of the housing 1 beneath the write-in opening 6 and the student writes his answer 12 on the exposed area of tape 10:

A slot 13 is provided in the rear wall of housing 1 in alignment with the tape 10 which can be threaded therethrough, as shown most clearly in FIG. 4. Where a roll of tape 10 is employed, the used portion of the tape may be allowed to roll up within the housing 1 because of the inherent bend of the paper. If desired, a positively driven wind-up roll, not shown, may be provided in the back portion of the housing 1.

Figure 2:
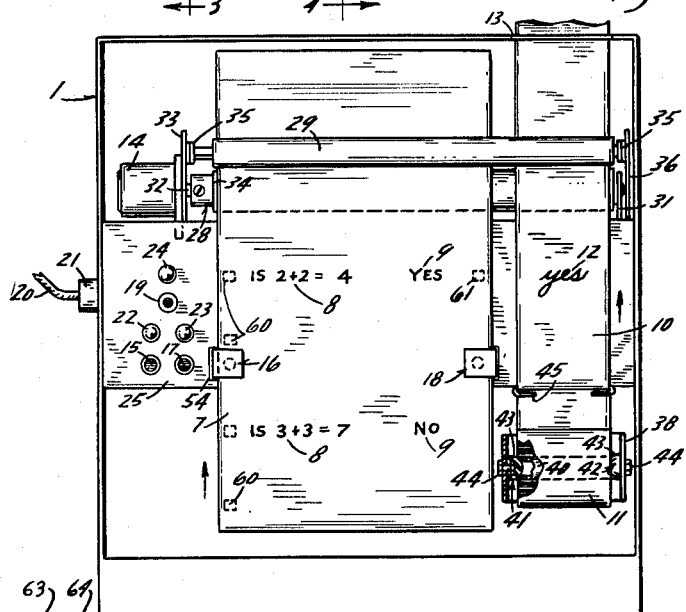
FIG. 2 is a top view of the educational device with the top cover removed.

A drive motor 14 is shown secured within the housing 1 to the left of the program tape 7 in FIG. 2. In the illustrated embodiment of the invention, the motor 14 is directly coupled to simultaneously drive the program tape 7 and the answer receiving tape 10 although an electro-responsive clutch or other suitable control may also be employed. The energization of the motor 14 is conjointly controlled by either a push button switch 15 and a tape sensitive switch unit 16 or a push button switch 17 and a tape sensitive switch unit 18, as more fully described hereinafter and more clearly shown in FIG. 5.

The push button switches 15 and 17 and a main control switch 19 are mounted to the left of the program presentation opening 5 for operation by the student. Switch 19 establishes the power supply connection to the various components including motor 14 from an incoming power cord or line 20. In the illustrated embodiment of the invention, line 20 is releasably connected to the device by a plug and socket connector 21 in the one side wall of housing 1.

Each of the switches 15 and 17 is adapted to establish initial energization of the drive motor 14 through a separate energizing circuit. The switch units 16 and 18 are connected one each in the respective energizing circuits to de-energize the drive motor 14 after selected movement thereof. Three small signal lamps 22, 23 and 24 are mounted immediately adjacent and above the respective switches 15, 17 and 19 and each is illuminated in response to actuation of the associated switch to indicate the condition or operative state of the device.

The tape sensitive switch unit 16 is mounted adjacent the left edge of the program tape 7, as viewed in FIG. 1, and is actuated to de-energize the motor 14 after movement of the tape 7 to present the next succeeding question or the answer to the previously presented question.

Similarly, tape sensitive switch unit 18 is mounted adjacent the right edge of the program tape 7, as viewed in FIG. 1. The circuit including switch 18 is conditioned to energize motor 14 in response to operation of switch 17. The switch 18 is connected to de-energize motor 14 in response to a movement of tape 7 presenting the second succeeding question, for example, rather than the immediately succeeding question within the program presentation opening 5.

Referring particularly to FIGS. 3 and 4 of the drawings, the upper side edges of the housing 1 are formed with a downwardly and forwardly slanting surface to correspondingly position the cover 2 and present the openings 5 and 6 for easy viewing of the tape 7 and writing upon the tape 10. The cover 2 preferably has a smooth exterior surface such that it can be used as a desk top for writing.

In the illustrated embodiment of the invention, a modular construction is employed to support and interconnect the motor 14, switches, lamps and other operating components to be subsequently described. A deck 25 extends transversely through the upper portion of the housing 1 in alignment with the openings 5 and 6 and includes an encircling depending flange or skirt 26. Small attaching nut and bolt units 27 pass through aligned openings in the side wall of housing 1 and the skirt 26 of deck 25 to fixedly secure the deck in place with the upper surface adjacent the plane of the top edge of housing 1. The tapes 7 and 10 pass over the upper surface of the deck 25 beneath the underside of the cover 2. The control switches 15, 17 and 19 are secured within suitable openings in the deck 25 for operation through the left most portion of opening 5, as shown in FIGS. 1 and 2.

A friction drive roll 28 and a backing roll 29 are rotatably mounted at opposite ends immediately adjacent the back edge of the deck 25 and in alignment with the program tape 7. The tape 7 is passed between the rolls 28 and 29 and frictionally grasped therebetween. Drive motor 14 is coupled to roll 28 and, when energized, rotates the roll 28 and moves the tape 7 beneath opening 5.

The friction drive roll 28 includes a supporting shaft 30 rotatably supported at the right end, as viewed in FIGS. 1 and 2, by a small bracket 31 which is bolted to the back skirt 26 of deck 25. The opposite end of shaft 30 is coupled to the motor shaft 32 of motor 14. A suitable plate-like bracket 33 is secured to deck 25 and projects rearwardly between drive roll 28 and motor 14 with the motor 14 secured thereto. The motor shaft 32 extends through an opening in bracket 33 to the shaft 30 of roll 28.

A sleeve 34 of sponge rubber or similar resilient material covers the shaft 30 for gripping of tape 7. The backing roll 29 has a smooth exterior surface and is movably mounted immediately behind roll 28 within the housing 1.

The opposite ends of roll 29 are similarly journaled in the upper end of similar bearing levers 35 which are pivotally secured at the lower end to the bracket 33 and a bracket 36, respectively. Bracket 36 is also a plate-like member and is bolted or otherwise secured to the skirt 26 of deck 25 opposite the side of bracket 33. Similar coil springs 37 are secured to the respective levers 35 and to the forward portion of corresponding brackets 36 and 33. The coil springs 37 urge the roll 29 into resilient engagement with drive roll 28. When the tape 7 is disposed between the rolls 28 and 29, the sponge rubber sleeve 34 establishes a frictional gripping or grasping of the tape such that rotation of the shaft 30 moves the tape 7 from the front to the back of the housing 1.

In operation, the cover 2 is opened and the program tape 7 initially fed over the deck 25 and between the frictional drive roll 28 and the backing roll 29. Cover 2 is then locked in the closed position and motor 14 is selectively energized to rotate the roll 28 and move the tape 7 from the front to the back of the housing 1 and past the program presentation opening 6. The proper movement of tape 7 is cyclically controlled by the conjoint action of the push button switches 15 and 17 and the tape sensitive switches 16 and 18.

Referring particularly to FIGS. 2 and 4, the answer receiving tape 10 from tape reel or roll 11 is shown passing from the front to the back within the housing 1.

The tape roll 11 is rotatably supported within a U-shaped saddle 38 which is secured to the bottom wall of the housing 1 by small bolts 39. Tape roll 11 includes a tubular core 40 which is journaled at the ends upon similar bearings 41 and 42 secured respectively to the opposite upstanding walls of saddle 38. Each of the bearings 41 and 42 is formed of rubber or other suitable material with a curved bearing surface 43 projecting into the end of core 40. Saddle 38 is formed of spring metal such that the bearings 41 and 42 frictionally engage the core 40 and create a frictional retarding force to the rotation of tape roll 11. This maintains the tape 10 taut beneath window 6.

An attachment nut is embedded in the bearing to receive a mounting bolt 44 which passes through the corresponding wall of saddle 38.

A small guide 45 may be secured to the front of deck 25 and includes bent-over edges defining a U-shaped edge guide for the opposite edges of tape 10.

The drive roll 28 and backing roll 29 move the tape 10 from roll 11, beneath the opening 6 in synchronism with the previously described movement of the program tape 7.

The lower portion of the opening 6 is unobstructed to allow the student to insert a written answer 12 on the answer receiving tape 10. A transparent cover 46 of plexiglass or other suitable transparent material is secured to the underside of deck 25 overlying the upper portion of the opening 6.

In the illustrated embodiment of the invention, the cover 46 is formed as an integral extension of the top portion of a transparent cover 47 overlying the program presentation opening 5. The integral covers 46 and 47 are secured to the deck 25 by clamping strips 48 and 49 which are secured to the deck 25 by small attachment bolts 50 with the strips overlying the respective upper and lower cover edges, as most clearly shown in FIGS. 2 and 3.

An opaque mask 51 is also clamped to the underside of cover 47 by the strips 48 and 49 which are preferably offset to establish longitudinal recesses for the edges of mask 51. The mask 51 is formed of a flexible opaque material such that it may readily be deformed for insertion of the edges in the space provided without removing of strips 48 and 49. Mask 51 includes a question presentation opening 52 and an answer presentation opening 53. The openings 52 and 53 in mask 51 are related to the particular arrangement of the questions 8 and answers 9 on tape 7. Variously arranged program tapes 7 may therefore be employed by clamping a correct mask 51 in place.

As previously described, the program tape 7 is driven and positioned to sequentially present a question 8 and a correct answer 9 within the program presentation opening 5. When a question 8 is presented within the opening 5, the student inserts what he considers to be the correct answer within the unobstructed portion of the opening 6. Push button switch 15 is then actuated to energize motor 14 and move the program tape 7 to present the correct answer 9 within the program presentation opening 5. The answer receiving tape 10 is simultaneously moved to position the inserted answer 12 beneath the transparent cover 2, as shown in FIG. 1. The inserted answer 12 may then be checked with the correct answer 9 but cannot be changed.

The program tape 7 and the answer receiving tape 10 are properly positioned within the openings 5 and 6 as a result of the action of the tape sensitive switch units 16 and 18.

In the illustrated embodiment of the invention, each of the tape sensitive switch units 16 and 18 is similarly constructed. Switch unit 16 will be specifically described and corresponding numbers applied to corresponding elements of switch unit 18 for reference purposes.

Referring particularly to FIGS. 2 and 5, the illustrated switch unit 16 is mounted within an opening 54 in deck 25 adjacent the left edge of the program tape 7. Switch unit 16 is a normally closed switch and includes a housing 55 which is attached to the underside of deck 25 by a bracket 56 to properly locate unit 16.

Bracket 56 is an inverted U-shaped member with the housings of switch units 16 and 18 secured to the respective depending portions.

A spring-loaded switch actuator 57 projects upwardly from housing 55 into sliding engagement with the underside of the program tape 7. A generally U-shaped brace 58 is secured to the housing 55 opening horizontally and with the upper leg forming a backing plate or stop 59 overlying the edge portion of tape 7 and the upper end of the actuator 57. The actuator 57 is continuously urged upwardly toward the stop 59 by suitable spring loading, not shown.

The program tape 7 passes between the actuator 57 and the stop 59. The normal thickness of tape 7 is insufficient to move the actuator 57 downwardly to open the switch unit 16. However, the program tape 7 is provided with longitudinally spaced operating elements 60 secured to the left edge of the program tape 7 in lateral alignment with actuator 57 and stop 59. Elements 60 may conveniently be small pieces of tape adhesively secured to the tape 7. When an element 60 is aligned longitudinally with switch unit 16, the actuator 57 is pressed downwardly and opens the switch unit 16 to complete the electrical path therethrough. Switch unit 16 is connected in the energizing circuit for motor 14 to conjointly control the energization thereof with the push button switch 15.

Operating elements 60 are properly spaced longitudinally of tape 7 in accordance with the spacing of questions 8 and answers 9 to actuate switch unit 16 and establish a sequential presentation of all the questions 8 and answers 9, as more fully described hereinafter in connection with the circuit operation of FIG. 6.

Switch unit 18 is similarly mounted upon bracket 56 with respect to the right edge of program tape 7. Actuating elements 61 are secured longitudinally spaced along the right edge of the program tape 7 for selective actuation of switch unit 18 which is connected with switch 17 to conjointly control energization of the movement of tape 7. The actuating elements 61 are placed to relate the program to only certain questions 8 and answers 9; for example, every other question 8 on the tape 7. The student may therefore by successively actuating switch 17 more rapidly proceed through the program by causing the tape 7 to sequentially present every other question.

The more rapid sequence of program presentation may be desirable for reviewing a previously studied program or for the student of greater learning ability.

The above construction of switch units 16 and 18 is shown for illustrative purposes. Any other suitable electroresponsive control which is actuated by selected portions of the program tape 7 to effect the sequential positioning of the questions and answers on the program tape within the opening 4 can be employed within the scope of the present invention. For example, a magnetic or conductive material might be provided in place of elements 60 and 61 and suitable sensing means substituted for the illustrated switch units 16 and 18.

Figure 6:
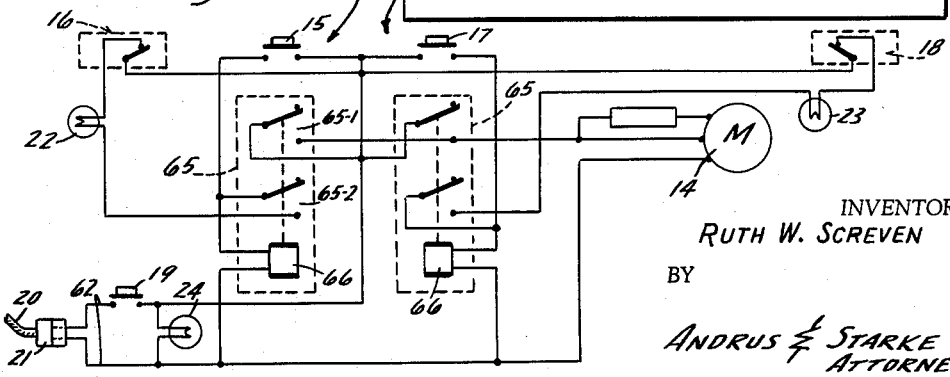
FIG. 6 is a schematic circuit diagram of an electrical control circuit for the apparatus shown in FIGS. 1–5.

A schematic circuit diagram of a preferred circuitry for the unit shown in FIGS. 1–5 is shown in FIG. 6.

Referring particularly to FIG. 6, the motor 14 is shown connected by leads 62 to the housing-mounted portion of connector 21 to receive power from the power supply line 20; such as the conventional 60 cycle power distributed in the United States. The on-off or main control switch 19 is inserted in one of the power leads 62 to turn the device on and off and associated lamp 24 is connected across leads 62 for energization when switch 19 is closed.

The push button switches 15 and 17 and the related tape sensitive switch units 16 and 18 are connected in separate and similar branch circuits 63 and 64 for controlling movement of tapes 7 and 10. The circuit 63 for switch 15 and the tape sensitive switch unit 16 is described in detail. Corresponding elements in the circuit 64 for switch 17 and switch unit 18 are similarly numbered for reference purposes.

An operating relay 65 includes a coil 66 which is connected across the power leads 62 in a series circuit with the push button switch 15 for manual control thereof.

A set of normally open contacts 65–1 are electromagnetically coupled to coil 66 and connected in the series circuit with the motor 14 across the leads 62 and normally hold the motor 14 de-energized.

Assuming a question 8 is presented in question open-latching contacts 65–2 coupled to coil 66. Contacts 65–2 are connected in a series circuit with the relay coil 66, the switch unit 16 and the lamp 22 to the power leads 62.

In FIG. 6, the relay 65 of circuit 63 is shown in a standby condition.

Assuming a question 8 is presented in question opening 52 of mask 51 and the student wishes to see the correct answer 9, the push button swich 15 is momentarily closed. Relay 65 is energized and closes the normally open contacts 65–1 and 65–2.

Closing of contacts 65–1 completes the circuit to the motor 14 which is energized to rotate the friction drive roll 28 and simultaneously move the program tape 7 and the answer receiving tape 10.

The simultaneous closing of latch contacts 65–2 completes the latching circuit for the relay coil 66 and maintains the relay 65 energized independently of the switch 15. Motor 14 remains energized until the circuit through contacts 65–2 and switch unit 16 opens. The lamp 22 is energized upon closing of contacts 65–2 and indicates the operation of the sequential presentation.

The output of motor 14 rotates the friction drive roll 28 which acts with rolls 29 to frictionally grasp and move the program tape 7 and the answer receiving tape 10 through the housing 1 and past the openings 5 and 6. When the element 60 for the answer 9 is aligned with the switch unit 16, the actuator 57 thereof is depressed and opens the switch unit 16. This breaks the latching circuit to relay coil 66 and relay 65 returns to the standby condition shown in FIG. 6.

In the illustrated embodiment of the invention, the inertia of the drive system of tapes 7 and 10 is such that following de-energization, the roll 28 coasts to a stop and establishes an output for a momentary period. The coasting of roll 28 moves the program tape 7 forwardly sufficiently to position the element 60 from alignment with the switch unit 16 which returns to the normally closed position and conditions the latching circuit for subsequent operation.

In summary, the illustrated embodiment of the invention is employed in the following manner.

The cover 2 is opened and the program tape 7 and the answer receiving tape 10 placed in the housing 1. The leading portion or end of the tapes 7 and 10 are passed over the deck 25 and between the drive roll 28 and backing roll 29. The answer receiving tape 10 is threaded through the guide 45 and out through the opening 13. Cover 2 is closed and lock 4 actuated to prevent unauthorized opening thereof.

Push button switch 15 is actuated to energize the motor 14, through the previously described circuit which maintains energization thereof until an element 60 on the edge of the tape 7 is aligned with the switch unit 16 to break the circuit. A question 8 is then aligned within the lower portion of opening 52 of mask 51 and within program presentation opening 5.

If desired, the first operation of switch 15 may present program instructions to the student. In accordance with one proposed program, the student is instructed to actuate switch 15 if his answer is wrong and to actuate switch 17 if his answer, in any given instance, is correct. The student, after reading the instructions, would again actuate switch 15 to obtain the first question.

The student writes a selected answer 12 within the opening 6 immediately below the transparent cover 46. The push button switch 15 is again actuated to initiate the controlled movement of the program tape 7 and the answer receiving tape 10. The question 8 moves upwardly, remaining within the upper portion of opening 52 and the correct answer 9 moves into the opening 53 of mask 51. Simultaneously, the inserted answer 12 moves beneath the cover 46 overlying the upper portion of opening 6, as shown in FIG. 1.

The correct answer 9 can be compared to the inserted answer 12.

If the inserted answer 12 is in error, push button switch 15 is again actuated to present the next question to proceed through the program with minimum speed.

If the inserted answer 12 is correct, push button switch 17 may be actuated in accordance with the program instructions to skip one or more questions, depending upon the preset placement of element 61, to proceed through the program at maximum speed.

The student by successive acuation of the push button switches 15 and 17 automatically completes all or any portion of the program carried on the program tape 7 and at a rate related to his ability to learn and previous knowledge.

The switch 15 is always actuated in the illustrated embodiment of the invention to move the correct answer 9 within opening 5. If desired, actuating elements may be applied in proper alignment with the answers 8 to allow actuation of switch 17 for presenting answers to the questions presented by actuation of switch 17.

In accordance with the present invention, cooperating and supporting devices may be interconnected with the program presenting machine. Supplementing audio and visual aid devices might be employed to increase the effectiveness of the teaching process. Interest maintaining and arresting devices such as lights, automatic scoring units or prize dispensing units might also be attached to the basic teaching machine.

The details of the illustrated embodiment of the invention may be varied in many details. For example, the separate strips of tape for presenting the program and receiving answers may be combined or replaced with a plurality of individual and separate sheets. The illustrated tapes may of course be formed of any suitable material other than paper; for example, microfilm or the like. Similarly, the actuation of the tape controlled switches may be responsive to a hole or any other characteristic of the program carrier means within the scope of the present invention.

The apparatus of the present invention provides a relatively simple and inexpensive educational or teaching aid which is adapted to accommodate widely different programs and which is sufficiently simple in operation to allow the use of same by young children.

Various modes of carrying out the invention are contemplated as being within the scope of the following claims particularly pointing out and distinctly claiming the subject matter which is regarded as the invention.

I claim:
1. In an electrically actuated educational device,
   (a) program presentation means carrying a series of bits of information for successive presentation,
   (b) a separate receiving means for receiving a constructed response independent of the device to the information presented by the program means,
   (c) a housing for said program presentation means and said receiving means and including viewing means having adjustably fixed exposure control means subdividing said viewing means for exposing selected portions of each program presentation means in accordance with the information thereon and means exposing a portion of the receiving means to receive the constructed response,
   (d) an electroresponsive drive means coupled to simultaneously move the program presentation means and the receiving means,
   (e) input means to selectively enable said electroresponsive drive means,
   (f) stop means actuated by the program presentation means and responsive to selected movement of the program presentation means to disenable said electroresponsive means, said selected movement being arranged to sequentially present said information in said viewing means, and
   (g) means to restrict access to the fixed exposure means.

2. The electrically actuated educational device of claim 3 having,
   (a) means to seal the constructed response inserted in the receiving means when response information is within the viewing means in response to succeeding actuation of the electroresponsive drive means and permitting comparison of the sealed constructed response and the response information.

3. The electrically actuated educational device of claim 3 wherein,
   (a) said adjustable fixed exposure control means includes a mask mounted as a part of the viewing means and having openings selected to separately present information on the program presentation means.

4. The construction of an educational device in accordance with claim 3 wherein,
   (a) said program presentation means includes at least one strip-like element mounted for longitudinal movement through the housing with bits of information including stimulus information followed by response information,
   (b) said receiving means includes at least one strip-like element mounted to one side of the program presentation means for longitudinal movement through the housing,
   (c) the exposure control means of the viewing means in the housing includes preset openings exposing restricted portions of the program presentation means and the receiving means, and
   (d) said electroresponsive drive means includes rotational frictional drive means frictionally gripping said strip-like elements and simultaneously moving the strip-like elements past the openings, said openings being selected to sequentially present said response information alone and said response information and said constructed response simultaneously within the openings in response to predetermined operation of the drive means.

5. The construction of the educational device in accordance with claim 6 wherein the program presentation means includes a correct response after a bit of information requiring a constructed response, and having, (a) a fixed transparent cover over the leading portion of the opening for the receiving means, and
(b) said electroresponsive drive means moving the constructed response applied to the receiving means beneath the transparent cover when the program presentation means is positioned to expose the correct response.

6. In an electrically operated program presentation device having a program carrier for sequentially presenting separate pieces of information stimulus and proper responses,
(a) first means to actuate the program carrier to sequentially present the stimulus information and proper responses in stepped relation, and
(b) manually operable means separate from and actuatable independently from the first means to actuate the program carrier at any point in the sequential presentation of information to skip at least one piece of stimulus information and thereby present only selected pieces of the stimulus information on the program carrier.

7. In an electrically operated educational aid,
(a) a box-like housing having a cover hingedly secured along one edge thereof, said cover having a transverse window generally centrally thereof,
(b) a support deck mounted in the housing in alignment with the window in said cover,
(c) a program tape carrying a series of bits of stimulus information and response information alternately spaced longitudinally of the tape, said tape being narrower than the housing and positioned to one side of the housing and adapted to be successively moved from the front of the housing over the support deck to the rear of the housing,
(d) an answer receiving tape positioned to the opposite side of the housing and passing over the support deck,
(e) friction drive roll means mounted within the housing rearwardly of the back edge of the support plate and frictionally gripping said program tape and answer receiving tape,
(f) tension means secured forwardly of the front edge of the support plate in alignment with and frictionally engaging said answer receiving tape,
(g) a drive means coupled to drive said friction drive roll means,
(h) a pair of independent energizing circuit for the drive means,
(i) a relay in each of said circuits having normally open contacts in series with the drive means and normally open latching contacts,
(j) switch means in each of said circuits mounted upon the support plate and accessible through said cover and connected in series circuit with the corresponding relay,
(k) tape actuated switch means in each of said circuits mounted in the path of different portions of the program tape and connected in series with the corresponding relay and the corresponding latching contacts,
(l) longitudinally spaced actuating means on the program tape in alignment with the tape actuated switch means, the actuating means adjacent one switch means being spaced in accordance with the stimulus information and response information and successively presenting in sequence the information on the program tape, the actuating means adjacent the other switch means being spaced in accordance with selected stimulus information to present said information and to skip the intermediate information, and
(m) said drive means including means to move the program tape to separate the actuating means and the switch means after disenabling thereof.

8. In an electrically operated educational aid,
(a) a box-like housing having a slanting top cover hingedly secured along one edge thereof, said cover having a transverse opening generally centrally thereof,
(b) a support plate spanning the housing immediately below the opening in the cover of the housing,
(c) a friction drive roll having a sponge-like roller rotatably mounted extending transversely within the housing adjacent the back edge of the support plate,
(d) a backing roll rotatably and cooperatively mounted within the housing adjacent the friction drive roll,
(e) resilient biasing means biasing the backing roll toward said friction drive roll,
(f) a program tape carrying information spaced longitudinally of the tape, said tape being narrower than the housing and positioned to one side of the housing and passing over the support plate and between the friction drive roll and the backing roll to back of the housing,
(g) a reel of answer receiving tape position to the opposite side of the housing and passing over the support plate and between said friction drive roll and said backing roll,
(h) electroresponsive means for actuating said friction drive roll and including means to cause restricted movement after de-energization of the electroresponsive means,
(i) input means to energize the electro-responsive means,
(j) stop control means for said electroresponsive means operatively coupled to the program tape and connected in circuit with the input means, said control means having a first position to operatively enable the input means and a second position to operatively disable the input means and de-energize the electroresponsive means, and
(k) longitudinally spaced actuating means on the program tape in alignment with the stop control means establish the second position of the control means to actuate the electroresponsive means in synchronism with presentation of information on the program tape, the movement of the electroresponsive means following de-energization of the electroresponsive means moving the actuating means to again establish said first position.

9. In an electrically operated educational aid,
(a) a box-like housing having a slanting top cover hingedly secured along one edge thereof, said cover having a transverse opening generally centrally thereof,
(b) a support deck spanning the housing immediately below the opening in the cover of the housing,
(c) a friction drive roll having a sponge-like roller rotatably mounted extending transversely within the housing adjacent the back edge of the support deck,
(d) a backing roll rotatably mounted behind the friction drive roll and extending transversely within the housing immediately contiguous said friction drive roll,
(e) a program tape carrying a series of bits of information spaced longitudinally of the tape, said tape being narrower than the housing and positioned to one side of the housing and passing over the support deck and between the friction drive roll and the backing roll to the back of the housing,
(f) a reel of answer receiving tape positioned to the opposite side of the housing and passing over the support deck and between said friction drive roll and said backing roll,
(g) frictional means associated with the reel of answer receiving tape to exert a slight backward pull on the answer receiving tape,
(h) a motor coupled to drive the friction drive roll and having sufficient inertia to maintain restricted output after de-energization of the motor, (i) an energizing circuit for the motor including a set of normally open motor contacts,
(j) a motor relay coupled to said normally open motor contacts to close the contacts when energized,
(k) a push button switch mounted upon the support deck and accessible through said transverse opening and connected in series circuit with said relay,
(l) a normally closed switch having an actuator engaging a surface of the program tape,
(m) a set of normally open latching contacts connected in series with the motor relay and said normally closed switch and operatively coupled to the motor relay to close as a result of energization of the motor relay, and
(n) enlargements on the program tape engaging said switch actuator and longitudinally spaced for successive alignment therewith in synchronism with presentation of the questions and answers on the program tape, the output of the motor after de-energization thereof moving the program tape to separate the actuator from the enlargement.

References Cited by the Examiner

UNITED STATES PATENTS

| | | | |
|---|---|---|---|
| 1,747,479 | 2/1930 | Maloney et al. | 40—53 |
| 1,987,154 | 1/1935 | Noffsinger | 242—55.2 |
| 2,158,644 | 5/1939 | Ward | 40—53 |
| 2,169,266 | 8/1939 | Matter | 35—9 |
| 2,760,290 | 8/1956 | Miller et al. | 226—43 |
| 2,826,828 | 3/1958 | Hamilton | 35—9 |
| 2,879,012 | 3/1959 | Sarro | 242—55.2 |
| 2,987,828 | 6/1961 | Skinner | 35—9 |
| 3,056,215 | 10/1962 | Skinner | 35—9 |
| 3,106,026 | 10/1963 | Jackson et al. | 35—9 |
| 3,116,564 | 1/1964 | Sanford | 35—9 |
| 3,137,078 | 6/1964 | Cornell et al. | 35—9 |
| 3,153,862 | 10/1964 | Sawyer | 35—9 |

EUGENE R. CAPOZIO, *Primary Examiner.*

LEO SMILOW, LAWRENCE CHARLES, JEROME SCHNALL, *Examiners.*

S. M. BENDER, *Assistant Examiner.*